United States Patent

Kubala

[15] 3,659,141

[45] Apr. 25, 1972

[54] CURRENT CONTROL CIRCUIT FOR OPERATING A DEFLECTION YOKE

[72] Inventor: Robert Kubala, Chicago, Ill.

[73] Assignee: Motorola, Inc., Franklin Park, Ill.

[22] Filed: May 20, 1970

[21] Appl. No.: 38,969

[52] U.S. Cl. ..............................315/18, 315/27 TD, 307/288

[51] Int. Cl. ..........................................................H01j 29/70

[58] Field of Search ...................315/18, 26, 27 TD; 307/288

[56] References Cited

UNITED STATES PATENTS 3,483,425 12/1969 Yanishevsky......................315/27 TD

*Primary Examiner*—Rodney D. Bennett, Jr.
*Assistant Examiner*—S. C. Buczinski
*Attorney*—Mueller and Aichele

[57] ABSTRACT

A current control circuit having a pair of current generators connected in circuit with one another at a common circuit point for controlling a direct current voltage source in such a manner as to produce an alternating current through current utilization means coupled to the common circuit point. Where a substantially linear increasing sawtooth-shaped control signal is applied to the current generators, the current output at the common circuit point is also a linear increasing sawtooth, initially of one polarity, passing through zero and then of another polarity to produce a current sweep signal suitable for use with a printed circuit deflection yoke where such is used as the current utilization means.

14 Claims, 1 Drawing Figure

Patented April 25, 1972 3,659,141
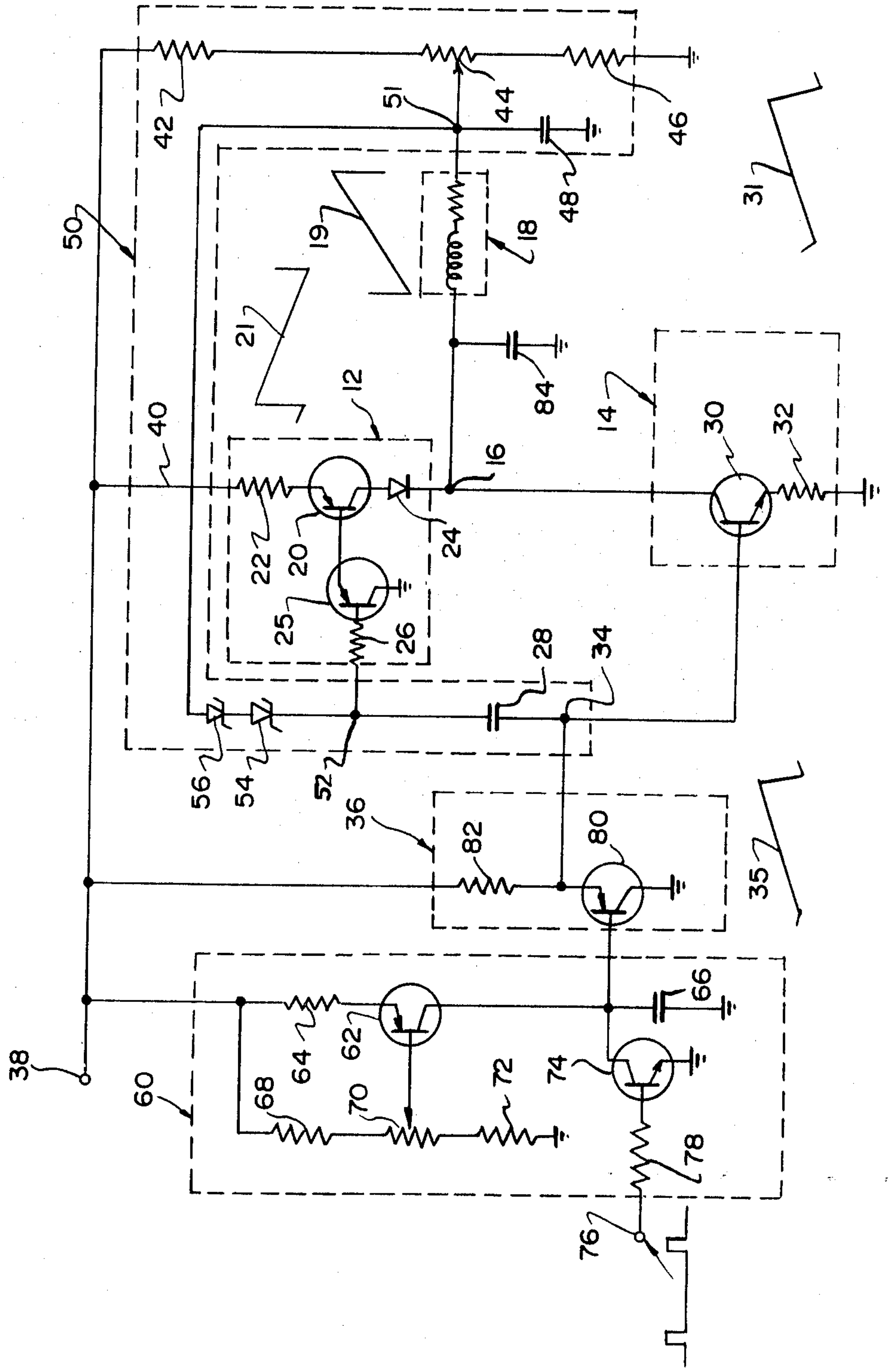
INVENTOR.
ROBERT KUBALA
BY Mueller & Aichele
ATTORNEYS.

CURRENT CONTROL CIRCUIT FOR OPERATING A DEFLECTION YOKE

BACKGROUND OF THE INVENTION

This invention relates generally to a current control circuit, and more particularly to a current generating deflection sweep circuit for use with an electron beam deflection yoke.

Heretofore, miniature transistorized deflection circuits have been developed to provide a linearly increasing current through a deflection yoke, such as electromagnetic coils positioned about television camera tubes or television picture tubes, to produce vertical and horizontal sweep action of the electron beam. However, such prior art current control circuits have suffered disadvantages such as high cost, complexity of circuitry, and the inability to operate efficiently with printed circuit deflection yokes in that they do not produce a highly linear current waveform. Deflection yokes of the conventional type, i. e., wire wound yokes of copper or the like, provide a relatively high inductance to resistance ratio, typically in the order of 1.0 mh., of inductance and 4 ohms of resistance, only to mention one specific example. Due to the inherent high inductance of such conventional yokes, the driving current necessary to produce a varying magnetic field suitable to deflect the electron beam of a cathode ray gun is easily maintained linear and of relatively low current value. The use of semiconductor devices such as transistors, or the like, to control current flow through such wire wound deflection coils can be achieved with transistors of moderate current rating. In the above mentioned example of yoke inductance and resistance, a deflection current of 175 ma. is required, and such current can be readily obtained by moderately large transistors to produce the necessary linear current over a continuous duty cycle.

However, the use of printed circuit yokes as electron beam deflection devices has become relatively popular because these yokes are small in size, have little weight, afford excellent geometric characteristics, and are easy to manufacture on a mass production basis. However, printed circuit yokes suffer from an inherent disadvantage of a low inductance to resistance ratio. For example, a printed circuit yoke having the same deflection capabilities as the wire wound yoke described hereinabove may have an inductance of 0.3 mh. and a resistance of 10 ohms. These electrical properties of printed circuit yokes require the feeding therethrough of a greater current, in the order of 250 ma. for the example given herein. Furthermore, when driving relatively large currents through low inductance, i.e., a device having a low inductance to series resistance ratios, it is difficult to achieve the proper linearity of the current waveform. If conventional circuit design is used to provide the necessary additional linear current, transistors having a higher current capacity must be used, the result being a more expensive control circuit.

One prior art approach of decreasing of current capacity of the transistor or transistors used to control current through a deflection yoke is a circuit arrangement whereby a pair of transistors have their load electrodes connected in series and one end of the deflection yoke is connected at a circuit point between the transistors. In this instance one transistor is rendered conductive to feed current through the deflection yoke in one direction during one half of the sweep cycle and then rendered nonconductive while at about the same time the second transistor is rendered conductive to feed current through the yoke during the next half of the sweep cycle. Although such arrangements of the prior art have provided circuits wherein only half the current of each deflection cycle is fed by one transistor at a time, thus reducing their current requirements, such prior art arrangements suffer greatly as a result of the need of synchronizing or matching the turn-off and turn-on time of the transistors so as to produce a substantially uniform sweep current. Furthermore, it is necessary to provide matched pairs of transistors to enable this circuit to operate properly.

SUMMARY OF THE INVENTION

It is an object of this invention to provide a current control circuit to deliver a linearly increasing sawtooth current through a deflection yoke without the need of controlling a turn-on and turn-off of transistors during the sweep cycle.

Another object of this invention is to provide a current control circuit wherein the need of providing matched pairs of transistors is eliminated.

Another object of this invention is to provide a current control circuit for use with printed circuit deflection yokes.

Yet another object of this invention is to provide a current control circuit for use as an electron beam deflection circuit which overcomes the problems of the prior art and which is relatively simple in construction, efficient in operation and inexpensive to manufacture.

Briefly, the current control circuit of the illustrated embodiment provides a pair of current generators connected in series to form a common circuit point therebetween. A deflection yoke winding has one end thereof connected to the common circuit point for receiving linearly increasing current therefrom to provide the necessary magnetic deflection field within an electron beam producing tube to influence beam deflection during a given sweep cycle. Preferably, the current generators each comprise current control devices having load electrodes and a control electrode, such as transistors, or the like. A control signal is delivered to the control electrode of both transistors from a buffer amplifier stage so as to cause substantially simultaneous conduction of both transistors, but of different relative values. That is, at the outset of conduction of these transistors one transistor is conducting at a maximum current value while the other transistor is conducting at a minimum current value. Over the duration of a sweep portion of a given cycle the control signal linearly decreases the current through the one transistor while simultaneously linearly increasing the current through the other transistor in a manner to maintain a substantially constant summation of current flow through the two transistors. The sum of absolute values of current flow through the transistors is maintained constant during any given sweep cycle. However, because of the relative conductive values of the two transistors the current at the common circuit point between the transistors will be first in one direction linearly decreasing to zero and then in another direction linearly increasing to a maximum value of opposite polarity. It is this varying current from the common circuit point which is fed through the deflection yoke.

The control signal fed to the transistor which initiates the sweep cycle is applied thereto through a capacitor to change the charge on the capacitor, either increasing or decreasing its charge, whichever the case may be, and, most advantageously, there is provided a clamping feedback circuit coupled between the other end of the deflection yoke and the above mentioned capacitor. This clamping feedback circuit includes threshold voltage means having a fixed predetermined threshold voltage value quickly to restore the capacitor to its initial charged condition, either adding charge to or removing charge from the capacitor. This novel clamping feedback circuit insures a uniform starting point for each sweep cycle so that a multitude of sweep cycles, such as that necessary to form a raster on a television camera tube, will always occur at the same starting points in the camera tube.

The circuit operates in response to a sawtooth generator of substantially linearly increasing characteristics and the current through the deflection yoke is similarly a linearly increasing current. The uniformity of linearity between the control signal and the current passing through the deflection yoke is accomplished without the need of compensating circuit elements to change parabolic or other waveforms into the desired linearly increasing waveform.

BRIEF DESCRIPTION OF THE DRAWING

The drawing is a schematic diagram showing the circuit arrangement of one preferred form of the invention.

DESCRIPTION OF THE PREFERRED EMBODIMENT

Referring now to the drawing there is seen a current control circuit constructed in accordance with this invention. The current control circuit is herein illustrated most advantageously as means for providing a linearly increasing sawtooth current waveform for use with deflection yokes of electron beam producing devices. The current control circuit includes a pair of current generators 12 and 14 connected in series at a common circuit point 16 for controlling current into and from the circuit point 16 during a given sweep cycle.

Preferably, a printed circuit yoke 18 has one end thereof connected to the circuit point 16 for receiving a linearly increasing sawtooth waveform, as indicated by reference numeral 19, during each sweep cycle. During the beginning of the waveform 19 the current generator 12 provides a maximum current value while current generator 14 provides a minimum current value. During this initial part of the current generating cycle the current generator 14, while conducting only a small amount of current, acts substantially as a high impedance in series with the current generator 12 thus causing substantially all of the current from the current generator 12 to pass through the printed circuit yoke 18 via the common circuit 16. As current decreases through the generator 12 it simultaneously increases through the generator 14 so as to progressively decrease the amount of current passing through the printed circuit yoke 18. When the current generator 12 produces substantially the same amount of current as the current generator 14, the value of current into the yoke 18 from the circuit point 16 is zero, this corresponding to the center of the sweep cycle. Further progression of decreasing current in the generator 12 and increasing current in the generator 14 will cause a reversal of current through the yoke 18 so that current now flows from the yoke 18 into the circuit point 16 and through the current generator 14. During the entire sweep cycle the current generators 12 and 14 provide a summation current which is substantially constant during the sweep cycle. That is, the decreasing and increasing currents of the generators 12 and 14, respectively, will at all times add up to some predetermined constant value.

In the illustrated embodiment of the present invention current generator 12 preferably comprises a current control device 20, such as a PNP transistor, or the like, connected in series with a current limiting resistor 22 and a diode 24. The current waveform which passes through the transistor 20 is indicated by reference numeral 21. The diode 24 prevents forward bias of the collector of transistor 20 during the retrace portion of the sweep cycle. To obtain current gain within the current generator 12 a direct coupled transistor 25 has the emitter electrode thereof connected to the base electrode of transistor 20 and the collector electrode thereof connected to ground potential. The direct coupled arrangement of transistors 20 and 25 may also serve substantially to increase the emitter-base resistance of the current generator 12 during a brief retrace portion of each sweep cycle, thus providing suitable isolation of capacitor 28 during the restoration of its charged condition. A control signal of linear sawtooth waveform is applied to the base electrode of transistor 25 through a resistor 26 and a control signal translating capacitor 28.

The current generator 14 comprises a current control device 30, such as an NPN transistor, or the like, connected in series with a current limiting resistor 32. The current waveform which passes through the transistor 30 is indicated by reference numeral 31. The base electrode of transistor 30 is connected to a circuit point 34 for receiving the same linear sawtooth control signal as is applied to the current generator 12. The sawtooth waveform control signal as delivered to the circuit point 34 is illustrated by reference numeral 35 and is coupled thereto by means of a buffer amplifier stage 36. During the initial part of the control signal 35, the charge on capacitor 28 gradually changes which, in turn, linearly decreases the current flow through the generator 12. However, the initial portion of the control signal 35 is sufficient only to cause a minor current flow through transistor 30 as a result of the low base-to-ground forward bias condition thereof. As the control signal 35 increases, so also does the current through current generator 14 while simultaneously decreasing the current through the current generator 12.

The current control circuit is connected to a direct current voltage source, preferably a regulated DC voltage, which may be, for example, in the order of 25 volts, and this potential is applied to the current generator 12 by means of a line 40. A voltage divider network comprising resistor 42, potentiometer 44 and resistor 46 is connected in parallel with the current generators 12 and 14. The potentiometer 44 serves as a centering adjustment for the sawtooth current waveform 19 so that the center of the sweep in a given electron beam device can be centered either with the center of the target member, in the case of a video camera, or with the center of a picture tube, in the case of a television receiver. Connected in parallel with the center tap of potentiometer 44 and resistor 46 is a capacitor 48 which serves to change the charge on capacitor 28 rapidly during the retrace portion of a given cycle back to an initial charged state desired for the beginning of each sweep cycle, and serves as an energy conserving device. Capacitor 48 also serves to supply and take on charge during the sweep period so that the voltage at circuit point 51 does not vary sufficiently to cause either transistor 20 or 30 to go into saturation during the normal sweep period.

In the preferred embodiment of the invention, a clamp feedback circuit 50 is provided which includes, among other things a pair of threshold devices 54 and 56, such as zener diodes, or the like. The zener diodes 54 and 56 are connected in series with the cathode of the diode 54 connected to a circuit point 52 at the junction of resistor 26 and capacitor 28 and the anode of diode 56 connected to a circuit point 51 at the junction formed by the other end of the yoke 18, the movable tap of potentiometer 44 and the capacitor 48. During the normal sweep cycle capacitor 28 gradually charges linearly in response to the control-signal 35 ultimately to attain a given amount of charge at the end of the sweep cycle, which when added with the potential at circuit point 51, is sufficient to exceed the breakdown voltage of the zener diodes 54 and 56. This action will substantially and instantaneously discharge the capacitor 28 into the capacitor 48 until a predetermined minimum charge condition is again reached on capacitor 28. As the capacitor 28 charges during the sweep cycle, zener diodes 54 and 56 will breakover at the end of the sweep cycle to remove the charge and deliver it to the capacitor 48 rapidly to change the level of charge on capacitor 28 to the desired predetermined starting value. The charge removed from capacitor 28 and applied to capacitor 48, although relatively small, is thus conserved and can be used during the second half of the next following sweep cycle when current through the transistor 30 is greater than the current through the transistor 20. Charge accumulates at circuit point 52 of capacitor 28 during retrace and normal sweep due to current from the base electrode of transistor 25 through resistor 26. This small accumulation is discharged by diodes 54 and 56 at the very end of normal sweep by zener action. Ideally, the voltage across capacitor 28 should remain perfectly constant, unless the circuitry is perturbed by centering adjustment, temperature changes, etc.

The control signal 35 is initially generated within a sawtooth voltage generator 60 comprising a transistor 62 connected in series with a resistor 64 and a capacitor 66. A voltage divider network comprising resistor 68, potentiometer 70 and resistor 72 is provided to forward bias the base emitter junction of transistor 62. Potentiometer 70 serves as a size adjustment for the current waveform 19 which, in turn, controls the size of sweep of an electron beam within an electron gun device within a desired range of values. Since sweep size adjustments are obtained within the sawtooth voltage generator 60, which by means of the buffer amplifier 36 and clamping circuit 50 are substantially completely isolated from the rest of the circuitry, change of sweep size will have no affect on the centering of the sweep as adjusted by potentiometer 44. That is, centering is maintained independent of size because the voltage waveform 35 at circuit point 34 determines only the peak-to-peak value, or swing, of the current waveform 19 and not its average or DC value. Therefore, adjustment of the centering potentiometer 44 influences only the center of the current waveform 19 without causing changes to the preselected size adjustment. The current control circuit therefore, most advantageously provides desirable independence of size adjustment, as provided by potentiometer 70, and centering adjustment, as provided by potentiometer 44.

The capacitance value of capacitor 66 and the collector resistance of transistor 62 are selected to cooperate with the input resistance of transistor 80 in parallel therewith to provide a relatively long RC time constant. The charging of capacitor 66 thus provides a relatively linear voltage waveform during the first fractional part of the RC time constant.

Resistors 64, 68, 70 and 72 together with transistor 62 provide an adjustable constant current source. Capacitor 66 integrates this constant current to provide a sawtooth voltage which is reset by switching transistor 74. A transistor 74 is connected across the capacitor 66 to completely discharge the capacitor at the end of each sawtooth waveform so generated by means of pulse signals applied to a terminal 76 and through a resistor 78. The pulse signals may be obtained by any suitable pulse forming synchronized circuitry, not shown. The buffer amplifier 36 also serves to match the impedance of the output of the sawtooth voltage generator 60 to that of the input of the current generators 12 and 14. The buffer amplifier 36, as herein illustrated, comprises only a transistor 80 connected in series with a resistor 82 to form an emitter-follower circuit.

Preferably, a capacitor 84 has one end thereof connected to the juncture of circuit point 16 and yoke 18 and the other end thereof connected to ground potential. Capacitor 84 serves to increase the speed of the retrace cycle and to limit the voltage at the collector of transistor 30 during such retrace cycle to prevent breakdown of the transistor.

It will be noted that the peak-to-peak amplitude of current waveform 19 is twice that of current waveforms 21 and 31 and, therefore, the current control circuit is highly efficient. This advantage allows the power supply, not shown but which is to be connected to power terminal 38, a deliver a peak current much less than the peak-to-peak value of the current waveform 19. For example, when the current control circuit is connected to a voltage source, in the order of 25 volts, a voltage source current of approximately 140 ma. will provide a peak-to-peak current of waveform 19 of approximately 240 ma. through the deflection yoke 18. Although the current control circuit has its most advantageous application for controlling current flow through printed circuit deflection yokes, it would be understood that a variety of other current utilization means may be substituted for the yoke 18.

Accordingly, the illustrated embodiment of this invention provides means uniformly to control linearly increasing current through a deflection yoke without the need of special circuit compensating components to reshape waveforms such as parabolic waveforms, or the like, and without the need of providing matched pairs of transistors. Also, the circuit provides a linearly increasing current at the yoke 18 directly in response to a linearly increasing control signal, and the peak-to-peak current value of the current through the yoke is greater than the peak current delivered by the power supply.

I claim:

1. A current control circuit for operation from a direct current voltage source to provide current of both polarities in a given branch of said circuit, comprising:

first and second current generating means connected in circuit, one with the other, at a common circuit point, said first current generating means delivering current to said common circuit point and said second current generating means receiving current from said common circuit point;

current utilization means having one end thereof coupled to said common circuit point for receiving current therefrom first of one polarity and then of another polarity; and control means coupled to said first and second current generating means for causing each of said current generating means initially to conduct current of different relative values such that at the outset of their conduction, during a given current generating cycle, the current through said first current generating means is maximum and the current through said second generating means is minimum to cause current of one polarity to flow into said current utilization means from said common circuit point at a maximum current value, said control means causing diminishing of current through said first current generating means while simultaneously causing increasing of current through said second current generating means ultimately to provide a zero current flow through said current utilization means, and said control means further simultaneously diminishing the current through said first current generating means and increasing the current in said second current generating means to cause a reversal of current in said current utilization means to a maximum value of opposite polarity.

2. The current control circuit of claim 1 wherein said control means includes waveform generating means to produce a substantially linearly increasing sawtooth waveform to control current through said first and second current generating means in a substantially linearly increasing and decreasing manner, respectively, to provide a substantially linearly increasing current through said utilization means.

3. The current control circuit of claim 1 wherein said utilization means is a deflection yoke for an electron beam device.

4. The current control circuit of claim 3 wherein said deflection yoke is a printed circuit deflection yoke.

5. The current control circuit of claim 1 wherein said first and second current generating means each include at least one current control device having a load electrode and a control electrode, said current control devices being connected in series with one another and having said common circuit point formed between their respective load electrodes.

6. The current control circuit of claim 5 wherein said control means provide a control signal to the control electrode of the current control device of said first current generating means through a coupling capacitor during which time the charge on said coupling capacitor changes from a desired initial charged condition, and further including a clamping feedback circuit having threshold voltage means connected between the other end of said utilization means and said coupling capacitor such that at the end of a given cycle of operation of the current control circuit, a difference of potential will appear across said threshold voltage means sufficient to render it highly conductive thereby restoring the charge on said coupling capacitor to the initial desired charge condition for the beginning of the next cycle of operation.

7. The current control circuit of claim 6 wherein a said threshold voltage means includes a zener diode.

8. The current control circuit of claim 7 further including an energy storage capacitor connected to the other end of said utilization means for receiving charge thereon in response to the conduction of said threshold voltage means when restoring said coupling capacitor to its initial desired charged condition.

9. The current control circuit of claim 8 wherein said coupling capacitor and said energy storage capacitor are substantially of the same capacitance value.

10. The current control circuit of claim 5 wherein said utilization means is a deflection yoke through which a sweep current passes during a major portion of the sweep cycle and a retrace current passes during a minor portion of the sweep cycle, and further including a diode connecting between the current control device of said first current generator and said circuit point to prevent said current control device from being forward biased during the retrace portion of the cycle.

11. The current control circuit of claim 5 wherein said utilization means is a yoke through which a sweep current passes during a major portion of the sweep cycle and a retrace current passes during a minor portion of the sweep cycle, and further including a capacitor connected between said common circuit point and ground potential to increase the rate of the retrace portion of the sweep cycle and to prevent voltage breakdown of said second current control device in said second current generating means.

12. The current control circuit of claim 1 wherein said first and second current generating means each include at least one transistor, the transistors being connected in series with one another, and said common circuit point being formed between said transistors, the transistor of said first current generating means being of one conductivity type and the transistor of said second current generating means being of the opposite conductivity type.

13. The current control circuit of claim 12 wherein said transistors have their collectors connected at said common circuit point.

14. The current control circuit of claim 1 wherein said current control means include waveform generating means to produce a substantially linearly increasing sawtooth waveform to control the current through said first and second current generating means in a substantially linearly increasing and decreasing manner, respectively, to provide a substantially linearly increasing current through said utilization means, said waveform generating means including waveform size adjusting means for adjustably selecting the size of said sawtooth waveform, buffer means coupled between said waveform generating means and said first and second current generating means for receiving said sawtooth waveform and delivering it simultaneously to said first and second current generators, and centering adjustment variable resistance means connected to the other end of said current utilization means for selectively adjusting the average DC current value through said current utilization means independent of and with no affect on the size of the sawtooth waveform as determined by said size adjusting means.

* * * * *